UNITED STATES PATENT OFFICE.

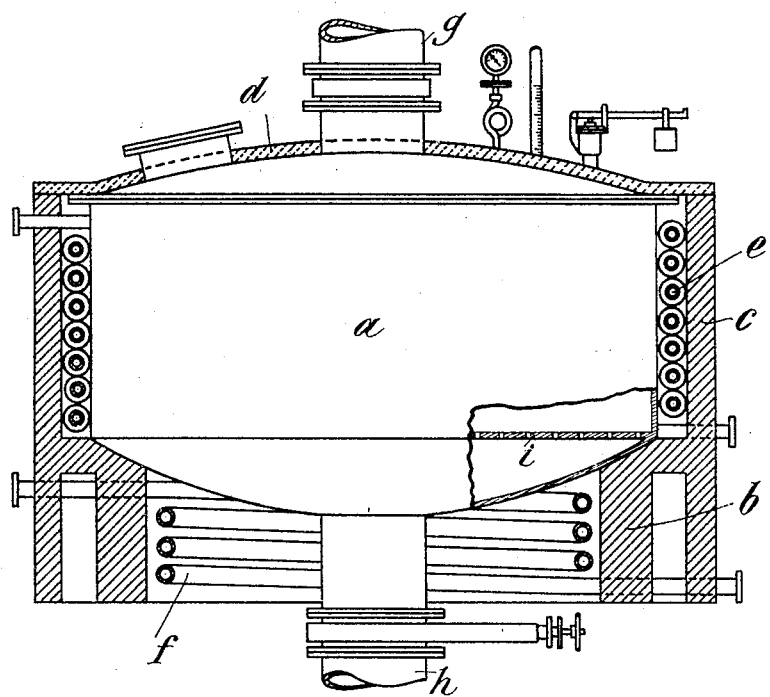

VALENTIN LAPP, OF LEIPSIC, GERMANY.

METHOD OF DRYING AND ROASTING GRAIN.

No. 805,367.　　　　Specification of Letters Patent.　　　　Patented Nov. 21, 1905.

Application filed May 31, 1904. Serial No. 210,517.

*To all whom it may concern:*

Be it known that I, VALENTIN LAPP, a subject of the King of Saxony, residing at No. 2 Georgi-Ring, Leipsic, in the Kingdom of Saxony, in the German Empire, have invented certain new and useful Improvements in Methods of Drying and Roasting Grain, of which the following is a specification.

In the specification of United States Letters Patent No. 690,592 was described a process according to which large quantities of germinated and non-germinated cereals were treated upon a perforated floor in an hermetically-closed chamber to the action of air-baths both above and below the floor.

As is known, germinated barley contains about forty-five per cent. of water, and by the said process the barley was sought to be deprived of this water within the space of six hours at a temperature not exceeding 45° centigrade.

As the apparatus in which the process was carried out was constructed of iron, and notwithstanding all precautions variations of temperature occurred, water of condensation was deposited on the walls of the chamber and ran down into the grain again. This formation of water of condensation is increased by the fact that hitherto in the treatment of grain, including malt and the like, the warm drying-air was always drawn in an upward direction through the chamber, so that the apparatus and the water contained in the malt were first heated below and the water began to evaporate from the bottom layers, and the steam had to be drawn by powerful ventilation through the whole body of malt, and as this was about 1.50 meters in thickness the steam became more or less condensed on the surfaces of the cooler upper layers of the grain and trickled back in drops into the lower layers again. By this means the drying was considerably retarded and the amount of heat and air employed was much greater than would otherwise be necessary for the drying process.

Although the aqueous vapor tends to rise, it is condensed as it rises through the upper part of the layer of grain, which is very thick, and, as stated, falls back as drops of water. The present invention has for its object to obviate this disadvantage when employing the large chambers described in the said specification; and it consists in causing the drying-air to be drawn from above downward through the layer of malt instead of from below upward as heretofore, and, furthermore, in the regulation of the temperature of the chamber walls and floor. The warm air is for this purpose preferably introduced at several points of the upper part of the chamber in order to insure its uniform distribution and is drawn off at the lowest part of the apparatus. By this means not only are the condensation of the aqueous vapor and the downward flow of the resulting drops of water prevented, but also the downward current of air carries with it the particles of water adhering to the grain at the same time that it effects the evaporation of the other part of the moisture. Those advantages are of course also obtained by vacuum-drying, as also in this case the aqueous particles, which have a tendency to descend through the layer of malt, are sucked off directly from below instead of being, as at present, first evaporated and then drawn upward through the layer of malt, as above described.

When the malt is so far dried that no water of condensation is formed on the grain or on the walls of the chamber, it is immaterial, so far as the drying is concerned, whether the air is introduced from above downward or from below upward.

In practically carrying out the complete process, however, the operation is performed in such manner that about two-thirds of the water is withdrawn from above downward, and then the last third is withdrawn from below upward, the supply of the hot drying-air being then effected from below. By this means the perforated floor is heated sooner and to a greater degree than the malt lying upon the same, so that this is, as it were, carried upon heated iron hurdles, by which means, as is well known, an aromatic malt is produced.

The drawing off of the aqueous vapors or the aqueous particles would require a large vacuum-pump. This work can therefore be very well effected by means of a mixing-condenser, the condensable vapors being condensed by contact with water that can be utilized in the other part of the brewing process, while the non-condensable vapors are drawn off in the known manner by means of a vacuum-pump. When using a mixing-condenser, the effect is produced that the water is drawn off below in liquid form, and consequently it is not required to be first evaporated. The water condensed on the walls of the drying-chamber runs downward, and the aqueous particles adhering to the malt and to the perforated bottom are drawn downward, where they are collected and led away without being converted into vapor. The formation of water of condensation must, however, also be prevented on the outer surface of the casing of the drying-chamber, as the casing, in particular when of large dimensions, cannot follow the variations of temperature to the same extent as occurs in the interior on heating or cooling, in particular as the outer air acts directly upon the casing. The latter is therefore surrounded externally by means of cooling or heating pipes, and the whole is inclosed in an insulating brickwork covering. The apparatus is consequently not influenced by external conditions of temperature, and cold or heat can be applied to it from the outside, whereby the formation of water of condensation is prevented and the whole can be maintained at a constant temperature. In consequence hereof the apparatus is particularly suited for malting purposes.

The upper pipes, which closely surround the chamber, are utilized as cooling-pipes, the metal casing of the chamber being used for transmitting the cold. The lower pipes being used as heating-pipes are preferably heated by means of steam and prevent, in particular when the desiccation of the grain commences, the formation of water of condensation.

On the accompanying drawing is shown, by way of example, a vertical section of an apparatus constructed according to the above-described invention. The chamber $a$, which is shown in elevation with a portion broken away, has a cylindrical form and is provided with the necessary fittings. It stands upon supports $b$ and is completely isolated from the outer air by brickwork $c$ at the sides and by an insulating layer of non-conducting material $d$ at the top. Between the brickwork $c$ and the wall of the chamber are provided the cooling-pipes $e$, while under the cylinder are arranged the heating-pipes $f$. The air-inlet pipe is shown at $g$ and the outlet at $h$, the perforated bottom of the chamber being indicated at $i$.

Having now particularly described and ascertained the nature of my said invention and in what manner the same is to be performed, I declare that what I claim is—

1. The method of drying and roasting grain, which consists in first introducing a heated-air supply into the grain from above and withdrawing it from below, and then reversing the direction of the heated-air current during the latter part of the operation.

2. The method of drying and roasting grain, which consists in introducing the heated-air supply into the grain from above and withdrawing it by suction from below during approximately the first two-thirds of the operation, and then reversing the direction of the heated-air current during the latter one-third.

3. The method of drying and roasting grain, which consists in passing a heated-air current from above through the grain in a suitable drying-chamber upon a metallic grid, and minimizing the condensation of moisture therein by regulating the temperature of the chamber-walls, then reversing the direction of the air-current and applying external heat to the floor of the chamber during the latter part of the operation.

4. The method of drying and roasting grain, which consists in passing a heated-air current through the grain in a suitable chamber from above and withdrawing it from below, then reversing the direction of the air-current during the latter portion of the operation, and minimizing the condensation of moisture in the chamber and facilitating the roasting by regulating the temperature of the chamber-walls and heating the floor thereof.

5. The method of drying and roasting grain, which consists in introducing the heated-air supply into the grain from above and withdrawing it by suction from below during approximately the first two-thirds of the operation, then reversing the direction of the air-current during the latter one-third, and applying external heat to the floor of the apparatus during the latter period.

6. The method of drying and roasting grain, which consists in introducing the heated-air supply into the grain from above and withdrawing it from below by suction during approximately the first two-thirds of the operation; then reversing the direction of the air-current during the latter one-third, applying external heat to the floor of the apparatus during the latter period to facilitate the roasting, and regulating the temperature of the walls of the apparatus to minimizing the condensation of moisture therein.

In witness whereof I have hereunto set my hand in presence of two witnesses.

VALENTIN LAPP.

Witnesses:
OTTO GÜNSHER,
FR. B. OMHORN.